(12) United States Patent
Toksvig et al.

(10) Patent No.: US 7,301,542 B1
(45) Date of Patent: *Nov. 27, 2007

(54) SYSTEM AND METHOD FOR FILTERING GRAPHICS DATA ON SCANOUT TO A MONITOR

(75) Inventors: Michael Toksvig, Palo Alto, CA (US); Walter Donovan, Saratoga, CA (US); Jonah M. Alben, San Jose, CA (US); Krishnaraj S. Rao, Sunnyvale, CA (US); Stephen D. Lew, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/954,548

(22) Filed: Sep. 29, 2004

Related U.S. Application Data

(63) Continuation of application No. 10/187,111, filed on Jun. 28, 2002, now Pat. No. 6,870,542.

(51) Int. Cl.
 *G06T 1/60* (2006.01)
 *G06T 9/00* (2006.01)
 *G06T 1/00* (2006.01)

(52) U.S. Cl. .................. 345/530; 345/555; 345/501
(58) Field of Classification Search ............... 345/531, 345/530, 555, 501, 503, 506, 556, 560, 558, 345/611, 613–615, 520, 537, 557
See application file for complete search history.

(56) References Cited

U.S. PATENT DOCUMENTS

| 4,654,710 | A | 3/1987 | Richard |
| 4,821,223 | A | 4/1989 | David |
| 5,349,547 | A | 9/1994 | Harrand |
| 5,420,608 | A * | 5/1995 | Choi et al. .................. 345/563 |
| 5,761,074 | A | 6/1998 | Nakamura |
| 5,936,616 | A * | 8/1999 | Torborg et al. ............. 345/555 |
| 6,374,279 | B1 | 4/2002 | Young |
| 6,407,741 | B1 * | 6/2002 | Morein et al. .............. 345/555 |
| 6,407,742 | B1 * | 6/2002 | Yeh et al. ................... 345/558 |
| 6,424,343 | B1 * | 7/2002 | Deering et al. ............. 345/419 |

(Continued)

OTHER PUBLICATIONS

Macelabs Corporation, "One Step Closer to a Fully Realistic 3D World on the Consumer PC A White Paper on the 3dfx T-Buffer™" *3dfx White Paper on T Buffer*, pp. 1-11, (Jul. 17, 1999).

*Primary Examiner*—Kee M. Tung
*Assistant Examiner*—Joni Hsu
(74) *Attorney, Agent, or Firm*—Townsend and Townsend and Crew, LLP

(57) ABSTRACT

A graphics processing system performs filtering of oversampled data during a scanout operation. Sample values are read from an oversampled frame buffer and filtered during scanout; the filtered color values (one per pixel) are provided to a display device without an intervening step of storing the filtered data in a frame buffer. In one embodiment, the filtering circuit includes a memory interface configured to read data values corresponding to sample points from a frame buffer containing the oversampled data; and a filter configured to receive the data values provided by the memory interface, to compute a pixel value from the data values, and to transmit the pixel value for displaying by a display device, wherein the filter computes the pixel value during a scanout operation.

20 Claims, 6 Drawing Sheets

U.S. PATENT DOCUMENTS 6,608,630 B1 * 8/2003 MacInnis et al. ........... 345/634
6,680,739 B1    1/2004 Robertus et al.
6,724,391 B1 * 4/2004 Peled et al. ................. 345/555

* cited by examiner

SYSTEM AND METHOD FOR FILTERING GRAPHICS DATA ON SCANOUT TO A MONITOR

CROSS-REFERENCES TO RELATED APPLICATIONS

This application is a continuation of application Ser. No. 10/187,111, filed Jun. 28, 2002 now U.S. Pat. No. 6,870,542, which disclosure is incorporated herein by reference for all purposes.

This application discloses subject matter related to commonly-assigned U.S. patent application Ser. No. 10/006,409, "System and Method for Real-Time Compression of Pixel Colors," filed Nov. 30, 2001, by Bengt-Olaf Schneider et al., the disclosure of which is hereby incorporated by reference in its entirety for all purposes.

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to a graphics display system and in particular to a system and method for filtering graphics data on scanout to a monitor or other display device.

Graphics display devices, such as monitor screens, produce images using an array of small-size picture elements ("pixels"), each having a solid color. The color of each pixel is independently controllable so that an arbitrary image can be produced on the display device. Pixel color is generally determined using a graphics processing system such as system 100 illustrated in FIG. 1. A graphics processor 105 receives image data to be rendered from a source such as a central processing unit (not shown). The image data generally includes position, location, size, and color information for various primitive objects—typically polygons—that make up the image. Graphics processor 105 samples the image data at a number of predetermined sample points (e.g., a point corresponding to the center of each pixel) and determines a color value for each pixel. These color values are stored, one word per pixel, in a frame buffer 110. A display pipe 115 periodically performs a scanout operation on frame buffer 110, reading and transmitting the pixel color values in sequence to a monitor (or other display device) 120.

Graphics processor 105 generally determines pixel color values according to the color of an object in the image that covers each pixel. FIG. 2 illustrates an example image 200 consisting of a polygon 210 of a first color against a background 215 of a different color. For each pixel in the display, including pixels 220a-220z, graphics processor 105 determines whether the pixel is covered by the polygon and stores the appropriate color value in frame buffer 110.

In general, some of pixels 220a-220z will be only partly covered by the polygon, e.g., pixel 220k. Graphics processor 105 includes a mechanism for determining a color for such "edge" pixels. In the simplest such mechanism, one point within each pixel (typically the pixel center) is used; the color of the pixel is determined by whether the center point is inside or outside the polygon boundary. This mechanism, however, leads to "aliasing"—undesired visible jaggedness at the edges of the polygon—due to the abrupt shift from one color to another at the edge pixels.

A more satisfactory solution uses oversampling and filtering to compute pixel color values. A graphics processor oversamples an image by determining the color at two or more sample points for each pixel. The sample points are generally located within (or at the edges or corners of) the pixel. The color value for each pixel is then determined by filtering (or downsampling) the oversampled data, e.g., by computing a weighted or unweighted average of a number of sample values and using the average as the pixel value for display purposes. Generally, for pixels that are completely covered by a solid-colored object, the filtered color value is the same as a single-sample color value. For "edge" pixels, some sample points may be covered by one object while others are covered by another object or by a background color. The filtered color value for an edge pixel is a blend of the respective color values of the sample points. This color blending in the edge pixels reduces visible jaggedness in the displayed image.

FIG. 3 illustrates a conventional graphics processing system 300 for oversampling and filtering. Graphics processor 305 stores oversampled data in an oversampled frame buffer 310, generally via a first frame buffer interface 307. A filter module 315 reads oversampled frame buffer 310 and filters the data to generate one color value per pixel. Each pixel color value is then written to a standard frame buffer 320, generally via a second frame buffer interface 317. If the oversampled frame buffer 310 and standard frame buffer 320 are stored in the same physical memory, then one frame buffer interface is used to access the common memory. During a scanout operation, display pipe 325 reads standard frame buffer 320 and transmits pixel color values to monitor 330.

Oversampling system 300 can reduce aliasing, but it has some drawbacks. For instance, system 300 requires two frame buffers 310, 315 to be provided, each having its own memory interface components 307, 317. Moreover, to display a pixel using system 300 requires at least three memory access operations: one or more read operations on oversampled frame buffer 310 to obtain the sample values for a pixel, a write operation on standard frame buffer 320 to store the filtered pixel value, and a read operation on standard frame buffer 320 to provide the filtered pixel value to the display device. Thus, both the amount of memory and the memory bandwidth required are increased.

Therefore, an improved graphics processing system capable of filtering oversampled data without requiring additional memory or memory access operations would be desirable.

BRIEF SUMMARY OF THE INVENTION

The present invention provides filtering of oversampled data during a scanout operation. Sample values are read from an oversampled frame buffer and filtered during scanout; the filtered color values are provided to a display device without an intervening step of storing the filtered data in a frame buffer. Thus, the present invention eliminates the need for a standard frame buffer and the attendant memory access operations for filtering of oversampled data.

According to one aspect of the present invention, a circuit for filtering oversampled data is provided. The circuit includes: a memory interface configured to read data values corresponding to sample points from a frame buffer containing the oversampled data; and a filter configured to receive the data values provided by the memory interface, to compute a pixel value from the data values, and to transmit the pixel value for displaying by a display device, wherein the filter computes the pixel value during a scanout operation.

According to another aspect of the invention, a circuit for filtering oversampled data is provided. The circuit includes a memory interface configured to read data values from a frame buffer containing the oversampled data; a latency buffer configured to receive the data values from the memory interface and to provide a set of data values corresponding to a group of sample points; a line store configured to receive sets of data values from the latency buffer and to store at least a subset of the data values; and a filter configured to receive a first set of data values corresponding to a current group of samples from the latency buffer and a second set of data values corresponding to a previous group of samples from the line store, to compute a pixel value using data values from the current set of data values and the previous set of data values, and to transmit the pixel value for displaying by a display device, wherein the filter computes the pixel value during a scanout operation.

The filter may be configured to compute as the pixel value a weighted or unweighted average of the data values corresponding to two or more sample points associated with a pixel. For instance, the sample points may be located at a center point of the pixel and each corner of the pixel. The filter may obtain the data values corresponding to the center of the pixel and lower corners of the pixel from the latency buffer and obtain the data values corresponding to upper corners of the pixel from the line store. In some implementations, the line store does not store a data value corresponding to a center point of a pixel.

According to yet another aspect of the invention, a circuit for decompressing and filtering oversampled data is provided. The circuit includes: a latency buffer configured to accept oversampled data from a frame buffer; a memory configured to store a plurality of compression bits indicating which sections of the oversampled data in the frame buffer are compressed; a decompression unit configured to receive the oversampled data from the latency buffer and the compression bits from the memory and further configured to decompress the oversampled data when one of the compression bits indicates that the oversampled data is compressed; and a filter configured to compute a pixel value from a plurality of sample values provided by the decompression unit, the sample values including at least a portion of the decompressed data, and to transmit the pixel value for displaying by a display device, wherein the filter computes the pixel value during a scanout operation.

According to a further aspect of the invention, a circuit for filtering oversampled data stored in a frame buffer is provided. The circuit includes: a memory configured to store a plurality of compression bits indicating which sections of the data in the frame buffer are compressed; a decompression unit configured to receive data from the frame buffer and the compression bits from the memory and further configured to decompress the received data when the compression bits indicate that the received data is compressed; a line store configured to store at least a subset of the decompressed data; and a filter configured to receive at least one current data value from the decompression unit and at least one previous data value from the line store, to compute a pixel value from the at least one current data value and the at least one previous data value, and to transmit the pixel value for displaying by the display device, wherein the filter computes the pixel value during a scanout operation. The circuit may also include a latency buffer configured to accept data from the frame buffer and to provide the data to the decompression unit.

In some embodiments, the circuit also includes a cache coupled to the decompression unit for storing the received data. The decompression unit may further compress the received data prior to storing the received data in the cache, using, for instance, lossy compression. Alternatively, the line store may be used to cache compressed data (either with or without further compression performed by the decompression unit).

According to a still further aspect of the invention, a circuit for filtering oversampled data stored in a frame buffer is provided. The circuit includes: a memory configured to store a plurality of compression bits indicating which sections of the data in the frame buffer are compressed; a cache configured to store data received from the frame buffer; a decompression unit configured to receive cache data from the cache and the compression bits from the memory and further configured to decompress the received cache data when the compression flag indicates that the data is compressed; and a filter configured to compute a pixel value from sample data, the sample data including at least a portion of the decompressed data, and to transmit the pixel value for displaying by a display device, wherein the filter computes the pixel value during a scanout operation. A latency buffer may also be included for accepting data from the frame buffer and supplying data to the cache or to the decompression unit.

According to another aspect of the invention, a system for generating graphical image data to be displayed is provided. The system includes: a graphics processor configured to generate oversampled data representing an image and to store the oversampled data in a frame buffer; a memory interface configured to fetch data values from the frame buffer; and a display pipe configured to perform a scanout operation. The display pipe includes: a latency buffer configured to receive data values from the memory interface and to provide groups of data values corresponding to a set of sample points; and a filter configured to receive the groups of data values from the latency buffer, to compute a pixel value from the data values and to transmit the pixel value for displaying by a display device, wherein the filter computes the pixel value during a scanout operation. The display pipe may also include a line store configured to receive data values from the latency buffer, to store at least a subset of the received data values, and to provide the stored data values to the filter after a delay.

Where some of the oversampled data is stored in compressed form, the display pipe may also include a decompression unit coupled between the latency buffer and the filter, the decompression unit configured to receive data values from the latency buffer, to determine whether the data values correspond to compressed data, and to perform decompression when the data values correspond to compressed data, wherein the decompression unit provides decompressed data to the filter. A cache may be coupled to the decompression unit for storing the data values corresponding to compressed data.

According to still another aspect of the invention, a method for filtering oversampled data during a scanout operation is provided. Oversampled data are read from a frame buffer. A weighted average of a plurality of values selected from the oversampled data is computed, thereby obtaining a pixel value. The pixel value is transmitted for displaying by a display device. Prior to computing the weighted average, a line store may be used to hold at least a subset of the oversampled data while additional oversampled data is read from the frame buffer. The method may also include, after reading the oversampled data from the frame buffer, determining whether any of the oversampled data is compressed; and decompressing the oversampled data when the oversampled data is compressed. Compressed oversampled data may be stored in a cache, and additional compression may be performed on the compressed oversampled data prior to storing the compressed oversampled data in the cache. This additional compression may be lossy.

The following detailed description together with the accompanying drawings will provide a better understanding of the nature and advantages of the present invention.

DETAILED DESCRIPTION OF THE INVENTION

The present invention provides filtering of oversampled data during a scanout operation. Sample values are read from an oversampled frame buffer and filtered during scanout; the filtered color values (one per pixel) are provided to a display device as they are generated, without an intervening step of storing the filtered data in a frame buffer. Thus, the present invention eliminates the need for a standard frame buffer and the attendant memory access operations.

Figure 1:
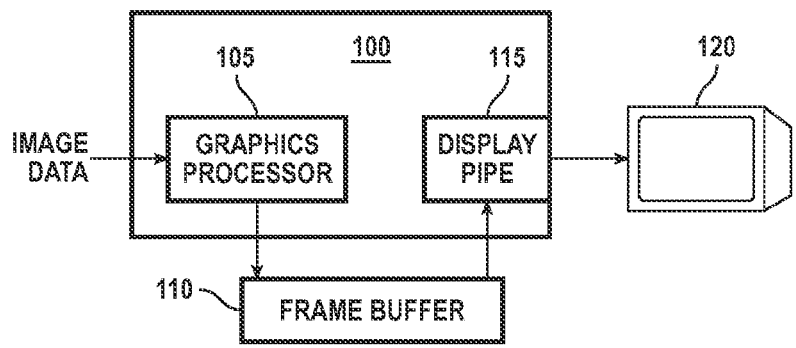
FIG. 1 is a simplified block diagram of a conventional graphics processing system.
Figure 2:
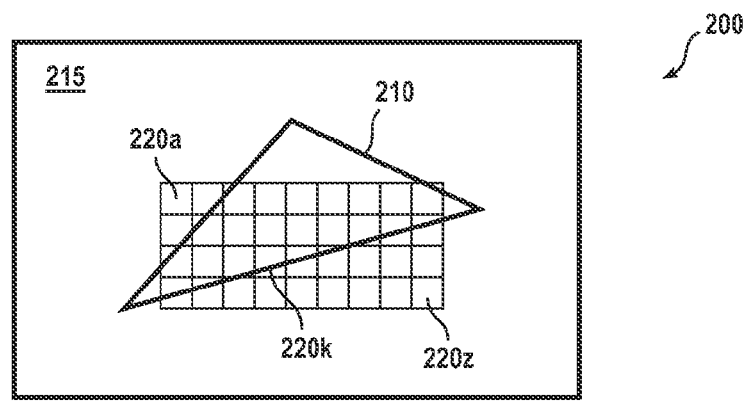
FIG. 2 is a representation of an image to be displayed by a graphics processing system.
Figure 3:
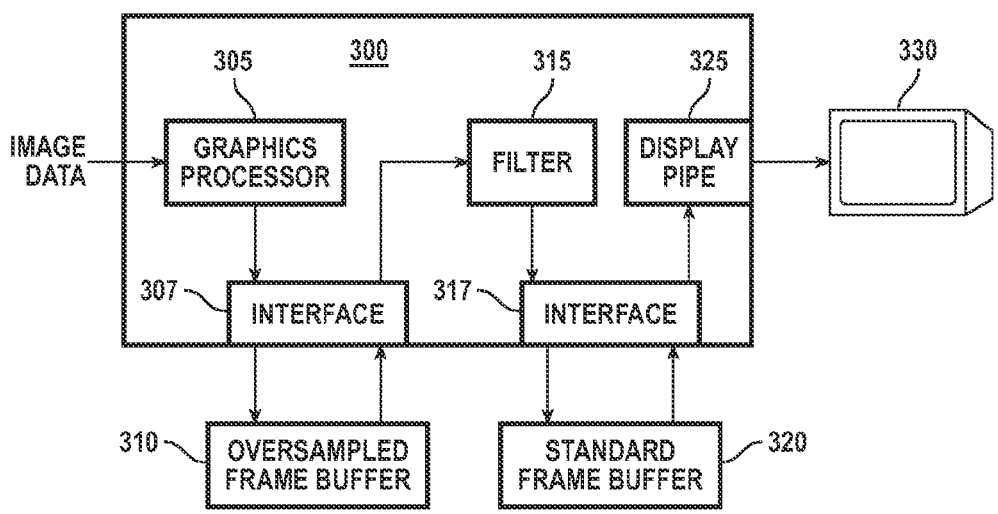
FIG. 3 is a simplified block diagram of a conventional oversampling graphics processing system.
Figure 4:
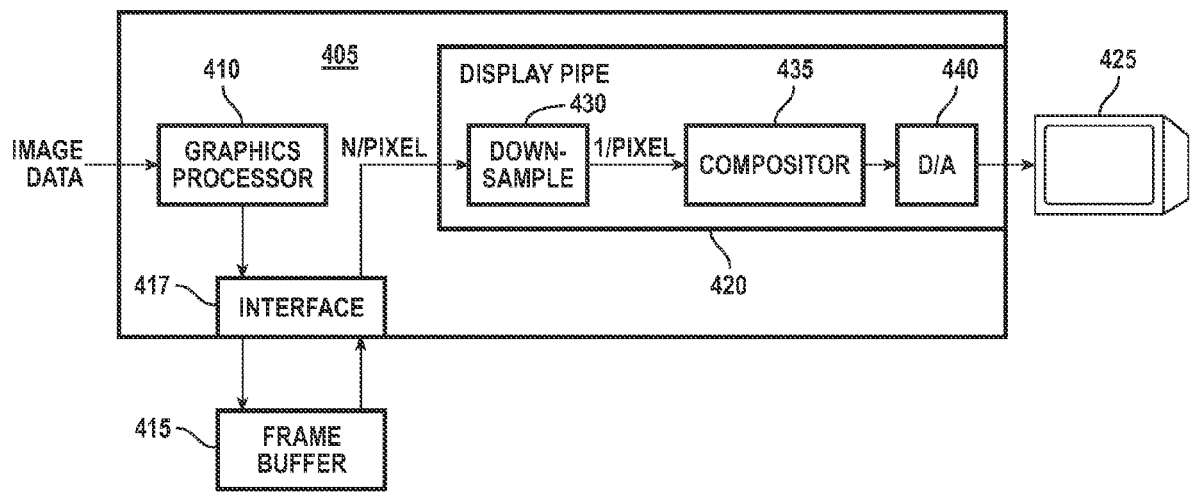
FIG. 4 is a simplified block diagram illustrating a graphics processing system according to an embodiment of the present invention.

FIG. 4 illustrates a graphics processing system 405 according to an embodiment of the present invention. Graphics processing system 405 includes a graphics processor 410, which selects sample points (generally more than one per pixel), determines color values for the sample points, and stores the color value (or "sample value") for each sample point in a frame buffer 415. Frame buffer 415 may also store other data, such as depth (Z) information associated with each sample. A frame buffer interface 417 is provided to manage memory access operations on frame buffer 415.

Graphics processing system 405 periodically performs a scanout operation to refresh and update an image displayed on a monitor (or other display device) 425. Scanout involves reading the sample values, generally in an established sequence, from frame buffer 415 and providing one color value for each pixel to display device 425, without an intervening step of storing the pixel color values in a memory. Scanout is performed by a display pipe 420, which includes a downsampling module 430 that receives a number (N) of sample values per pixel from frame buffer 415 and computes a filtered color value (or "pixel value") for each pixel. These filtered color values are transmitted to display device 425 as they are generated, i.e., without an intervening step of writing the pixel values to a memory. Downsampling module 430 may be implemented in a variety of ways, depending on the particular filtering technique employed; some specific embodiments will be described further below.

Display pipe 420 may include other components as well, such as a compositor 435 for selecting between pixel values generated by downsampling module 430 and pixel values generated by another source of pixel data (e.g., a video overlay), a digital-to-analog converter 440, and/or other components known in the art. It will be appreciated that display pipe 420 generally operates in a pipelined fashion, with its various components operating concurrently on data provided by the respective upstream components.

A first embodiment of downsampling module 430 will now be described. In this embodiment, two sample values per pixel are provided in frame buffer 415, and the two sample values for each pixel are stored in adjacent memory locations in frame buffer 415. During a scanout operation, frame buffer interface 417 reads the sample values each memory location in frame buffer 415 sequentially and provides the values to downsampling module 430. Thus, downsampling module 430 receives the two sample values for a pixel as a pair of consecutive sample values. Downsampling module 430 filters the data by averaging each pair of consecutive sample values and passes the resulting pixel value to downstream components in display pipe 420.

As described further below, the implementation of downsampling module 430 in display pipe 420 may be varied, depending on the filtering algorithm, the order in which sample values are read out from frame buffer 415 during scanout, whether frame buffer 415 includes compressed data, and so on. Based on the teachings of the present disclosure, a person of ordinary skill in the art will recognize other ways and/or methods of implementing the present invention.

Figure 5A:
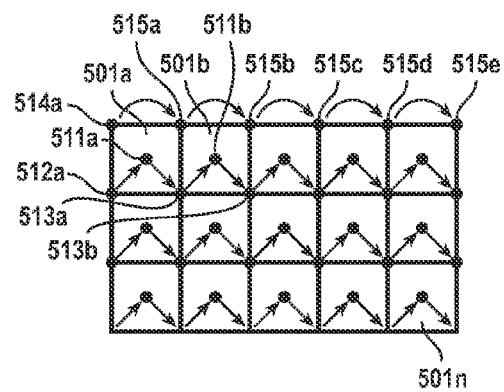
FIG. 5A illustrates a set of sample points used to perform quincunx filtering.

A second embodiment of a downsampling module performs "quincunx" filtering, which uses five sample values per pixel. FIG. 5A illustrates the locations of sample points used for quincunx filtering for an array of pixels (boxes) 501a-501n. It will be appreciated that this sampling pattern can be extended to a pixel array of arbitrary size. The color value for each pixel, e.g., pixel 501a, is determined by computing a weighted (or unweighted) average of five sample points: the pixel center 511a, the lower left corner 512a, the lower right corner 513a, the upper left corner 514a, and the upper right corner 515a. Because adjacent pixels share corner points, the number of sample values stored in frame buffer 415 is only about twice the number of pixels, even though five samples are used to generate each pixel color value.

FIG. 5A also indicates (using arrows) an order that may advantageously be used for storing sample values in frame buffer 415. The resulting arrangement of sample values in frame buffer 415 is illustrated as an array 550 in FIG. 5B. In this arrangement, the first row 551 of array 550 includes values for the top-edge group of sample points 514a, 515a, 515b, . . . , 515e. A null value may be stored between each sample value in the top-edge group, as indicated by the empty entries in the first row 551 of array 550. (A reason for including these null values will be described below.) The next group of sample points, stored in a second row 552 of array 550, has a zigzag pattern: lower corner 512a, center 511a, lower corner 513a, center 511b, and so on across the row of pixels. Subsequent groups of sample points follow the same pattern as row 552. Storing the sample values in this order enhances the efficiency of providing a downsampling module with all the values needed to filter each row of pixels in turn, as will be described further below. Alternatively, samples could be stored in a zigzag sequence starting with upper corner 514a, followed by center 511a, upper corner 515a, center 511b, and so on. (In this case, the last sequence of sample values would include only values for corner points and optionally, null values.) It should be noted that a group of sample values corresponding to a row of pixels need not coincide with a physical row of memory cells in a memory array or any other memory structure of frame buffer 415. Any mismatch between the memory structure and the groups of samples may be adjusted during scanout, as will be described below.

Figure 5B:
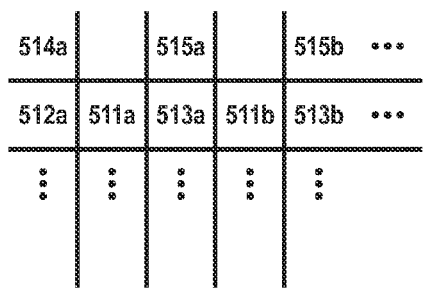
FIG. 5B is a table illustrating an arrangement of quincunx sample points stored in a frame buffer.
Figure 6A:
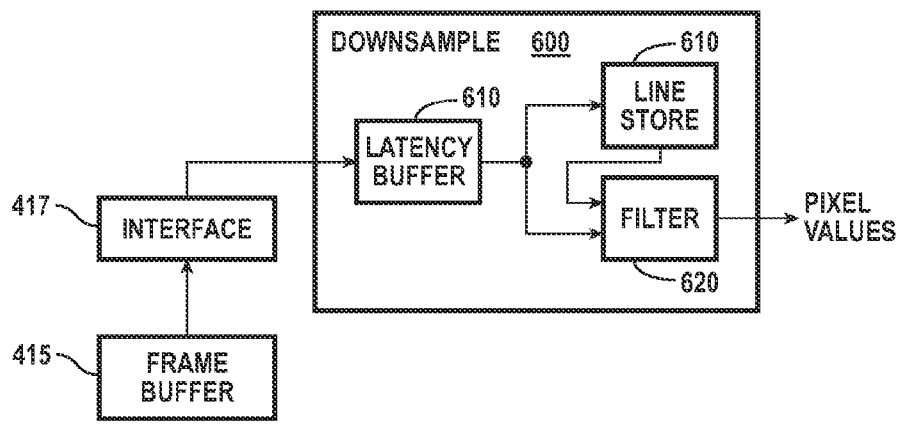
FIG. 6A is a simplified block diagram of a downsampling module according to an embodiment of the present invention.

FIG. 6A illustrates an embodiment of a downsampling module 600 that is adapted to perform quincunx filtering during a scanout operation. In this embodiment, the oversampled data are arranged in frame buffer 415 as shown in FIGS. 5A-B. Frame buffer 415 provides data via frame buffer interface 417 to downsampling module 600. Downsampling module 600 includes a latency buffer 610, a line store 615, and a filter 620. Filter 620 computes a weighted average of the center and four corner sample values for each pixel. Latency buffer 610 and line store 615 manage the sharing of sample values between pixels in neighboring rows of the display.

More specifically, latency buffer 610 receives blocks of sample values from frame buffer interface 417 and provides a group of sample values corresponding to a row of array 550 (FIG. 5B) to line store 615 and filter 620. In general, latency buffer 610 may be implemented as a first-in, first-out (FIFO) buffer that regroups blocks of sample values it receives to coincide with the rows of array 550. Latency buffer 610 is useful, for instance, if readout of frame buffer 415 occurs in blocks that span more than one row of array 550. In other embodiments, e.g., where the oversampled frame buffer data is read out in blocks that correspond to one row of array 550, a different implementation of latency buffer 610 (or no latency buffer at all) may be provided.

Filter 620 uses sample values from two consecutive groups of samples to compute the weighted average for pixels in a row of the display. The values for the center sample and the lower corner samples for each pixel in the row are in one group, while the values for the upper corner samples are in the previous group. Line store 615 is used to provide filter 620 with the upper corner values from the previous group. Line store 615 and filter 620 receive each group of sample values from latency buffer 610 at substantially the same time. Line store 615 latches the sample values and then provides them to filter 620 concurrently with the next group of sample values supplied by latency buffer 610. Thus, for each row of pixels, filter 620 obtains the center and lower corner values from latency buffer 610 and the upper corner values from line store 615.

Because the values of center samples in the previous group are not needed, line store 615 may be configured to latch only the corner values (i.e., every other value) from each group, thereby dropping the unneeded center values. If null values are included in the first group of sample values, as illustrated in row 551 of FIG. 5B, line store 615 may be configured to treat each group in an identical manner, regardless of whether the group corresponds to the top-edge sample points. In other embodiments, it may be desirable for line store 615 to retain all values from each group.

Upon receiving the sample values, filter 620 computes an average of the five sample points associated with each pixel in the current row of pixels. The average may be a weighted average computed by multiplying each sample value by an appropriate weighting factor, then summing the weighted values. The weighting factors may have preprogrammed values or adjustable values under the control of graphics processing system 405. In an alternative embodiment, an unweighted average may be used.

Figure 6B:
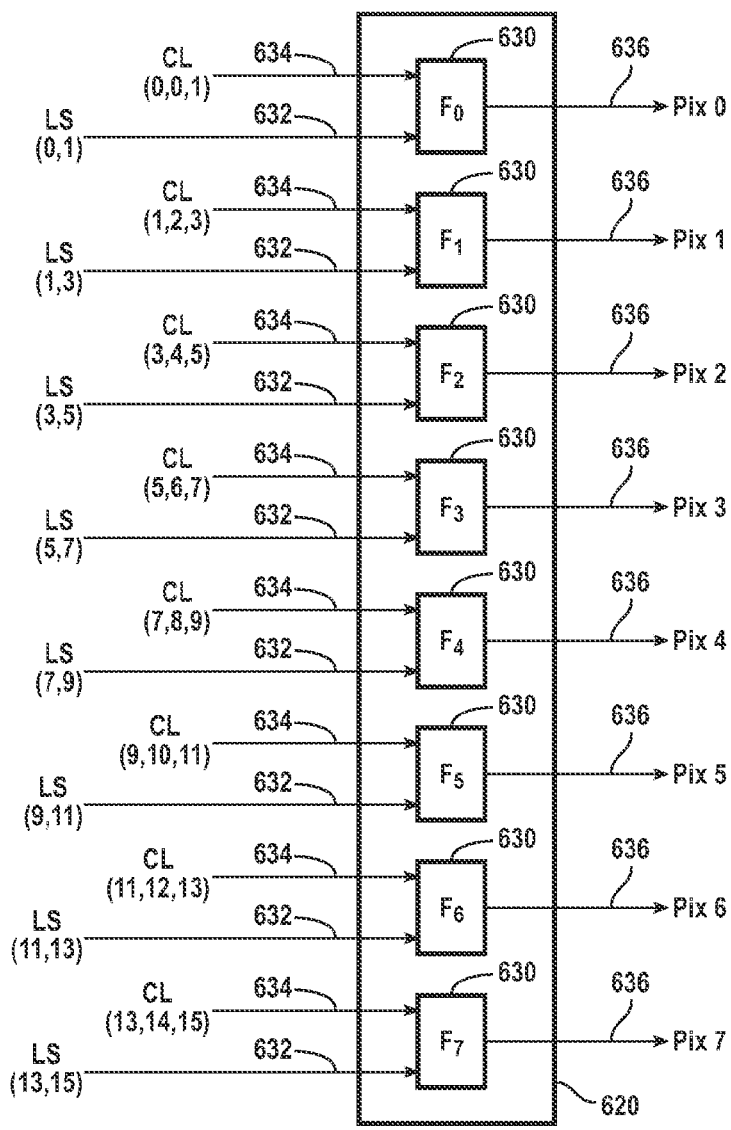
FIGS. 6B-C are simplified block diagrams of a filter for computing a downsampled pixel value according to an embodiment of the present invention.
Figure 6C:
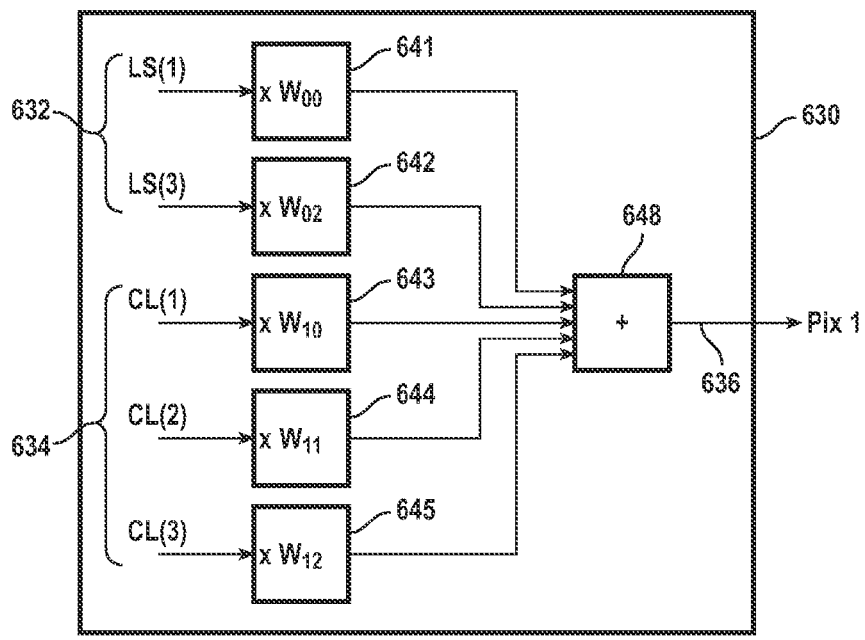

Filter 620 may be implemented using multiply and add circuits or other suitable components. One implementation of filter 620 for the case of quincunx filtering is shown in FIGS. 6B-C. FIG. 6B is a block diagram showing inputs and outputs to a filter 620 that performs filtering on eight pixels in parallel using eight averaging units 630. Each averaging unit 630 receives two pixel values for a previous row from line store 615 on an input bus 632 and three pixel values from latency buffer 610 on an input bus 634. Each averaging unit 630 computes a weighted average of its five inputs and provides a pixel value on an output line 636. Each averaging unit 630 has the same internal structure, as shown in FIG. 6C. Multipliers 641-645 weight each of the five pixel values according to preselected weighting factors. Adder 648 sums the weighted values to produce the final pixel value. This implementation is illustrative and other configurations may be used, with or without parallel processing; any number of pixels may be processed in parallel.

It will be appreciated that variations and modifications to downsampling module 600 are possible. In one alternative embodiment, line store 615 may be configured to store data at reduced precision. For instance, if the corner samples for a pixel receive a lower weight than the center sample, line store 615 may store the corner sample values at a reduced precision, thereby reducing the storage requirements without visibly degrading the image.

In other embodiments, downsampling module 600 may be adapted to support different filtering techniques, including techniques where sample points are not shared between pixels. In such embodiments, a line store might not be needed, although a line store may be advantageously used, e.g., if multiple groups of sample values read in different operations from frame buffer 415 are to be provided together to filter 620. Additionally, as mentioned above, latency buffer 610 may be included or omitted, depending on the configuration of frame buffer 415.

A third embodiment of a downsampling module for performing filtering during scanout will now be described. In this embodiment, frame buffer 415 stores compressed data for some or all of the sample points, thereby reducing the amount of memory used to store an image as well as the number of memory accesses needed to read image data from or write image data to the frame buffer. As will be described below, a downsampling module may be adapted to decompress the data during scanout prior to filtering.

A number of data compression techniques are known in the art. The above-referenced U.S. patent application Ser. No. 10/006,409, "System and Method for Real-Time Compression of Pixel Colors," incorporated by reference herein, describes examples of such techniques, two of which will be briefly described herein to establish a context for the decompression techniques described below. It is to be understood that any compression technique may be substituted for these examples.

Figure 7A:
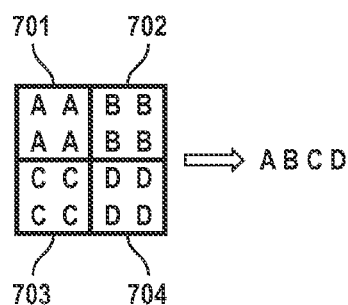
FIGS. 7A-B illustrate data compression techniques for storing sample values in a frame buffer.

FIG. 7A illustrates a compression technique that may be used where four samples per pixel are provided. A decision to compress data or not is made independently for each "atomic block" of 2×2 pixels 701-704, corresponding to sixteen samples. If each of the four samples in pixel 701 has the same value (A), and the same holds for the other pixels (e.g., each sample in pixel 702 has value B; in pixel 703, value C; and in pixel 704, value D), then the atomic block can be compressed. Instead of writing sixteen values for these sixteen sample points, graphics processing system 405 writes only one value per pixel (i.e., values A, B, C, D) to frame buffer 415. To identify which atomic blocks are compressed, graphics processing system 405 (FIG. 4) includes a compression bit, also called a tag bit, corresponding to each atomic block, indicating whether or not the block is compressed. The compression bits may be stored in frame buffer interface 417, in the downsample unit 830, in an off-chip memory and cached in frame buffer interface 417, or anywhere else in display pipe 420 as is convenient.

Figure 7B:
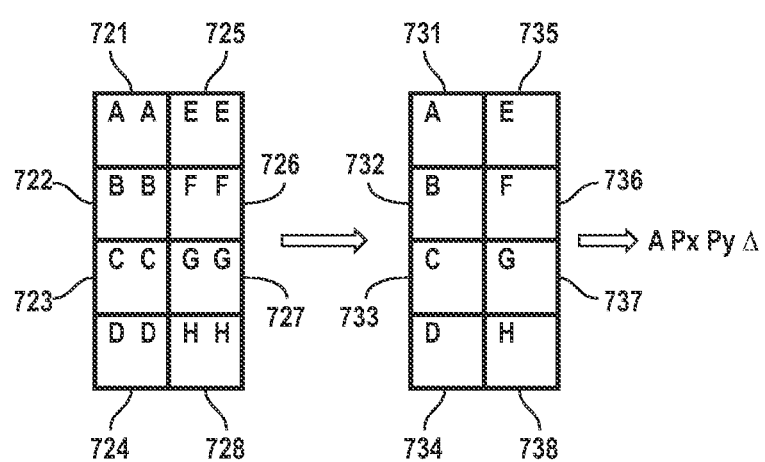

FIG. 7B illustrates an alternative compression technique that may be used where two samples per pixel are provided. A decision to compress data or not is made independently for each 4×2 atomic block of pixels 721-728, corresponding to sixteen samples. If each of the pixels contains two samples having the same value (A in pixel 721, B in pixel 722, and so on), a first stage of compression may be performed to obtain a partially compressed block of pixels 731-738. For partially compressed blocks, a second stage of compression is attempted by using linear approximations to represent the change (gradient) in color value from one pixel to its neighbors in the block, so that the values A, Px, and Py are produced, where Px indicates the gradient in the horizontal direction and Py indicates the gradient in the vertical direction. Errors in the linear approximation are encoded as offset values ($\Delta$). If the offset values $\Delta$ are sufficiently small, then the four values A, Px, Py, and $\Delta$ are stored and a compression bit (similar to the compression bits described above) corresponding to the atomic block is set to indicate that the block is compressed. Otherwise, the sixteen original sample values are stored in the oversampled frame buffer and the compression bit is set to indicate that the block is not compressed.

Figure 8:
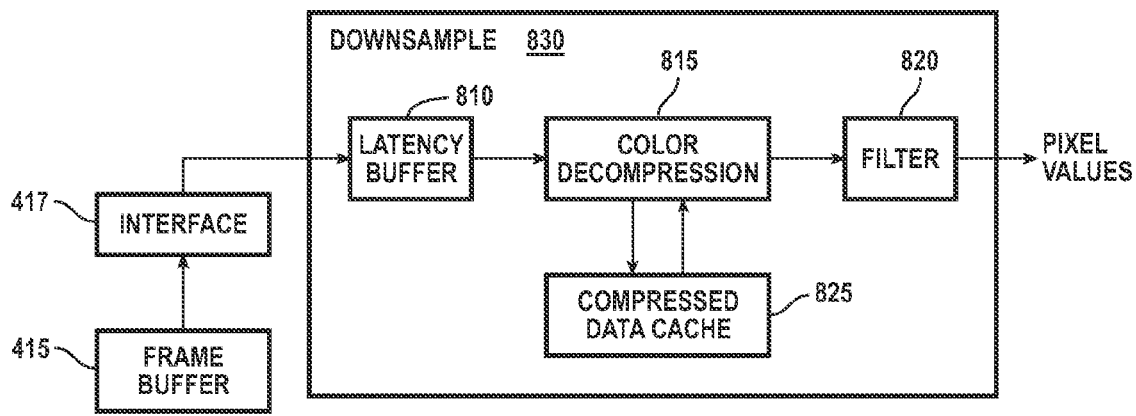
FIG. 8 is a simplified block diagram of a decompression and downsampling module according to an alternative embodiment of the present invention.

FIG. 8 illustrates an embodiment of a downsampling module 830 adapted to perform decompression in addition to filtering during scanout. Downsampling module 830 is generally similar to downsampling module 600, but module 830 includes a color decompression unit 815 coupled between a latency buffer 810 (which is generally similar to latency buffer 610 described above) and a filter 820 (which computes pixel values from groups of sample values provided by color decompression unit 815). Color decompression unit 815 determines whether data received from frame buffer interface 417 are compressed and decompresses any compressed data before providing the data to filter 820.

Color decompression unit 815 uses a compressed data cache 825 to store received compressed data that will need to be accessed again. For instance, in the atomic-block-based compression techniques described above, sample values may be stored in frame buffer 415 in groups corresponding to a horizontal row of sample locations. For a compressed atomic block, the four data values are stored only in the group corresponding to sample locations associated with the first row of the atomic block. These data values are needed for each of the four groups of sample values that include sample locations within the atomic block. Use of an on-chip cache removes the need for rereading the compressed data values from frame buffer 415, thereby improving processing efficiency. The operation of compressed data cache 825 will be described further below.

During scanout, color decompression unit 815 receives groups of data values including compressed and/or uncompressed data from latency buffer 810 and decompresses any compressed portions before providing a group sample values to filter 820. To determine whether particular samples correspond to compressed data, color decompression unit 815 receives compression bits from frame buffer interface 417.

Figure 9:
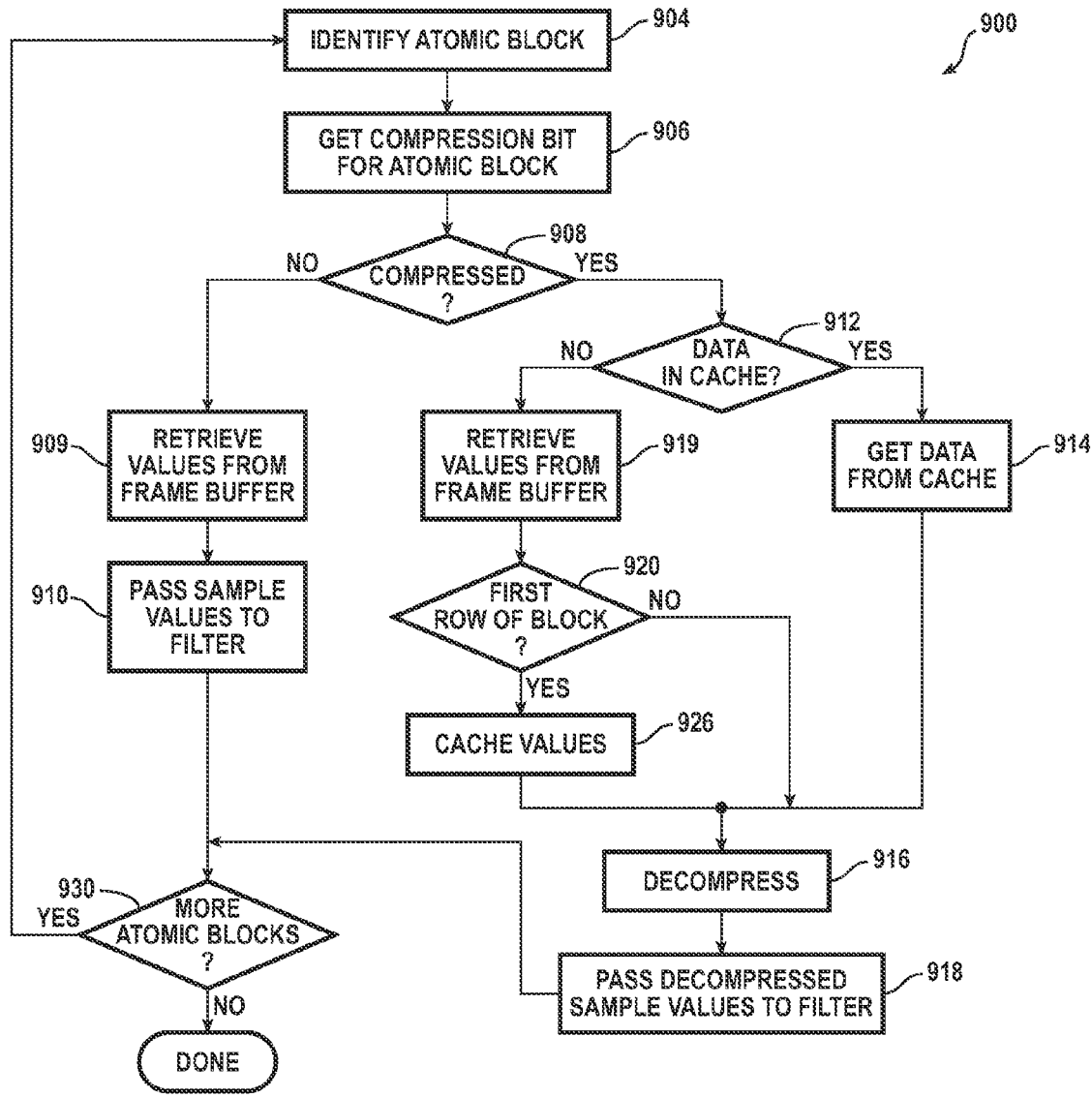
FIG. 9 is a flow chart illustrating processing steps for decompressing data according to the present invention.

FIG. 9 illustrates an exemplary caching process 900 performed by downsample unit 830 in an embodiment where atomic-block-based compression has been applied, the atomic blocks are assumed to span two pixels vertically, and pixels do not share samples. Scanout is based on atomic blocks, and if an atomic block is compressed, fetched data applies to a plurality of pixels and can be cached for subsequent scan lines. Hence the scanout process identifies an atomic block that contains the next pixel that needs to be scanned out (step 904) and obtains an indication as to whether the identified atomic block is compressed (step 906), e.g., the compression bit for the atomic block. At step 908, it is determined whether the atomic block is compressed. If the atomic block is not compressed, then at step 909, data (generally a set of sample values for a pixel) are received from frame buffer 415 via latency buffer 810. At step 910, the data values are passed through as sample values to filter 820.

If the atomic block is compressed, then at step 912, color decompression unit 815 checks for the compressed data in cache 825. If the data are cached, the compressed data are fetched from the cache at step 914 and decompressed at step 916. Details of decompression techniques for the above-described example algorithms are provided in the above-referenced U.S. patent application Ser. No. 10/006,409, "System and Method for Real-Time Compression of Pixel Colors," incorporated by reference herein. The decompressed sample values are provided to filter 820 at step 918.

If the data are not cached, then data for the atomic block are received from the frame buffer via the latency buffer at step 919. If the pixel(s) being scanned out is (are) in the first row of the atomic block (step 920), then the compressed data represent pixels in more than one scan line, and at least some of the data can be reused in a subsequent scan line. Therefore, the data for that atomic block (at least the part of the data corresponding to pixels in a subsequent scan line) are cached (step 926). The data are then decompressed (step 916) and the sample values for the pixels in the current scan line that are part of the atomic block are sent to filter 820 (step 918). If, at step 930, more atomic blocks remain, the process returns to step 904; otherwise, the process is complete.

In this embodiment, color decompression unit 815 acts as a cache manager for compressed data cache 825. Thus, caching step 926 described above may include determining whether there is sufficient space in cache 825 and not caching data when sufficient space is not available. Likewise, when sufficient space is not available (or at prescribed intervals), color decompression unit 815 may identify any cached data that will not be needed again (e.g., where the group of data values corresponding to the last row of the atomic block has already been read and decompressed) and remove such data in order to free up space in cache 825.

It is to be appreciated that decompressing downsampling module 830 described herein is illustrative and that variations and modifications are possible. For instance, compressed data cache 825 could be maintained in and managed by frame buffer interface 417, rather than being maintained in downsampling module 830 and managed by color decompression unit 815. It is also possible to implement decompression and filtering during scanout without using a compressed data cache, although some inefficiency due to rereading data from frame buffer 415 may result. The techniques for compressing and decompressing data are not restricted to the examples described herein; color decompression unit 815 may be modified to support a variety of compression schemes, with or without atomic blocks. Additionally, it will be appreciated that a line store similar to line store 615 described above could be used in decompressing downsampling module 830; the line store would receive decompressed data from color decompression unit 815, latch some or all of the data, and provide it to filter 820 after a suitable delay. Filter 820 may be configured to perform any appropriate filtering technique. Samples may be shared among pixels and accordingly may be sent to the filter 820 more than once.

Figure 10A:
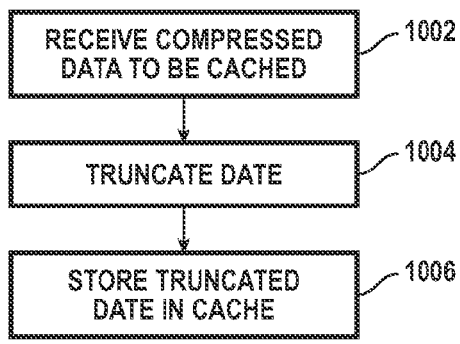
FIGS. 10A-B are flow charts illustrating processing steps for further compression and decompression of data, respectively, according to the present invention.

In some embodiments, the compressed data may be further compressed by decompression unit 815 prior to storing it in compressed data cache 825 (e.g., step 926). Suitable techniques for such further compression include lossy compression algorithms designed to minimize artifacts in the displayed image. One such technique is illustrated in the flow charts of FIGS. 10A (compression) and 10B (decompression). In FIG. 10A, at step 1002, color decompression unit 815 receives compressed data from frame buffer 415 and determines that the data are to be cached. Color decompression unit 815 truncates the data by dropping a selected number of least significant bits (LSBs) at step 1004. The remaining most significant bits (MSBs) are then cached at step 1006. Thus, compressed data are cached at a reduced precision.

Figure 10B:
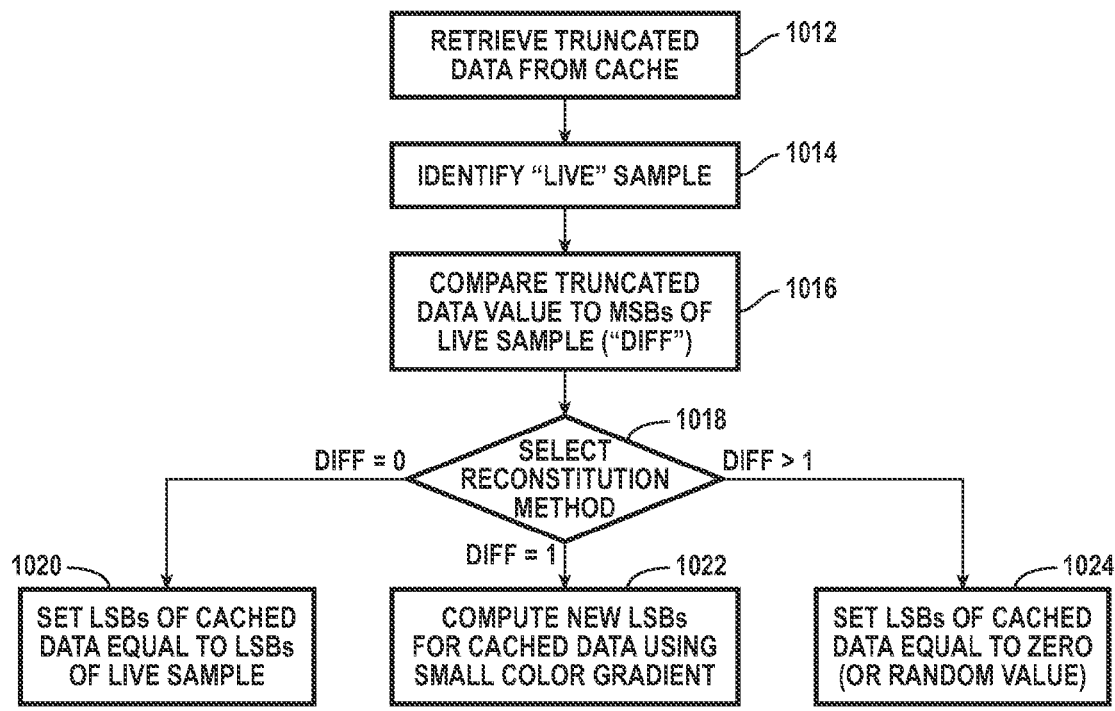

To minimize visual artifacts, the reduced-precision (truncated) data values are reconstituted to full precision on retrieval from the cache, as illustrated in FIG. 10B. At step 1012, truncated data are retrieved from cache 825. At step 1014, color decompression unit 815 identifies a "live" sample, which is a non-truncated sample in the current group of samples located as close (in display coordinates) as possible to the truncated sample. The truncated sample is compared to the MSBs of the live sample at step 1016 to determine a difference. Based on the difference, a reconstitution method is selected at step 1018. If the MSBs of the two samples are the same, then a zero color gradient is assumed, and at step 1020, the LSBs of the truncated sample are set equal to the LSBs of the live sample. If the MSBs of the two samples differ by one, then a small color gradient is assumed, and at step 1022, new LSBs for the truncated sample are computed accordingly. If the MSBs of the two samples differ by more than one, then a large color gradient is assumed, and at step 1024, the LSBs of both the truncated and live samples are set to zero (or to randomly selected values); any error thus introduced has little or no visible effect on image quality due to the rapid color change in the affected area of the image. After reconstituting the LSBs, color decompression unit 815 performs additional decompression steps to determine the sample values to be provided to filter 820.

It will be appreciated that other compression and decompression techniques could be substituted for the techniques described herein, and that either color decompression module 815 or frame buffer interface 417 could perform the compression and decompression operations, depending on where compressed data cache 825 is maintained.

Figure 11:
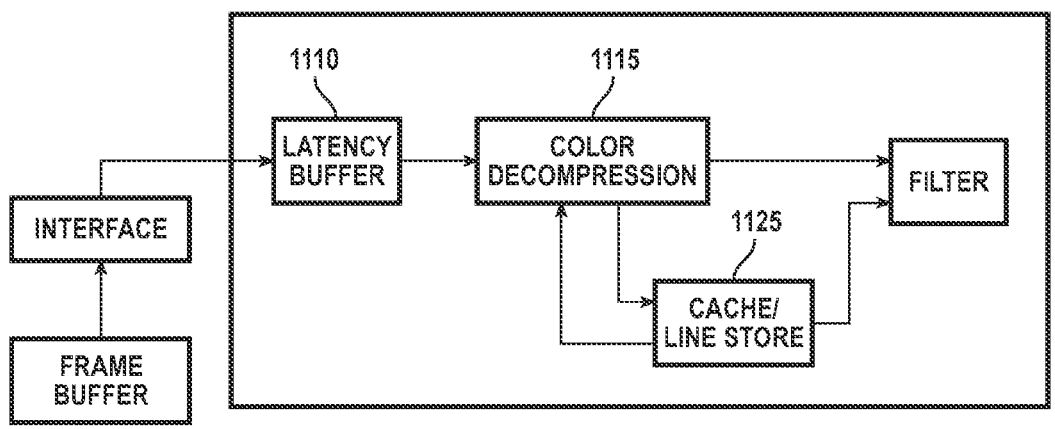
FIG. 11 is a simplified block diagram of a downsampling module according to another alternative embodiment of the present invention.

In another alternative embodiment, illustrated in FIG. 11, the compressed data cache and the line store may be unified. As described above, both the cache and the line store hold data values from samples in previously read groups. In view of the foregoing descriptions, implementation of a unified cache/line store 1125 is straightforward. Unified cache/line store 1125 may be managed by color decompression unit 1115, as shown, or by latency buffer 1110, depending on the implementation. In still other embodiments, the cache, line store, and latency buffer may all be unified for the purpose of supplying all needed sample values for a pixel together to the filter.

While the invention has been described with respect to specific embodiments, one skilled in the art will recognize that numerous modifications are possible. For instance, a wide variety of filtering algorithms may be implemented, and a particular algorithm may or may not require sharing data values between pixels. Various combinations of a latency buffer, a line store, and a compressed data cache may be implemented, depending on the filtering algorithm and the sequence in which the sample values are read from the frame buffer during scanout, as well as whether the frame buffer stores compressed data.

The present invention may be implemented using hardware, software, or any combination thereof and may be used for supplying data to any type of display or output device that uses pixel values for displaying an image.

Thus, although the invention has been described with respect to exemplary embodiments, it will be appreciated that the invention is intended to cover all modifications and equivalents within the scope of the following claims.

What is claimed is:

1. A circuit for decompressing and filtering oversampled data, the circuit comprising:
   a latency buffer configured to accept oversampled data from a frame buffer;
   a memory configured to store a plurality of compression bits indicating which sections of the oversampled data in the frame buffer are compressed;
   a decompression unit configured to receive the oversampled data from the latency buffer and the compression bits from the memory and further configured to decompress a first section of the oversampled data during a scanout operation in the event that one of the compression bits indicates that the first section of the oversampled data is compressed, wherein the compressed first section of the oversampled data includes one or more color values; and
   a filter configured to compute a pixel value from a plurality of sample values provided by the decompression unit, the sample values including at least a portion of the decompressed data, and to transmit the pixel value for displaying by a display device, wherein the filter computes the pixel value during a scanout operation.

2. The circuit of claim 1, wherein the memory is in a frame buffer interface.

3. The circuit of claim 1, wherein the memory is an external memory chip.

4. A circuit for filtering oversampled data stored in a frame buffer, comprising:
a memory configured to store a plurality of compression bits indicating which sections of the data in the frame buffer are compressed;
a cache configured to store data received from the frame buffer;
a decompression unit configured to receive cache data from the cache and the compression bits from the memory and further configured to decompress the received cache data during a scanout operation in the event that the compression flag indicates that the data is compressed; and
a filter configured to compute a pixel value from sample data, the sample data including at least a portion of the decompressed data, and to transmit the pixel value for displaying by a display device, wherein the filter computes the pixel value during the scanout operation.

5. The circuit of claim 4, further comprising:
a latency buffer configured to accept data from the frame buffer and to supply data to the cache.

6. The circuit of claim 4, further comprising:
a latency buffer configured to accept data from the frame buffer and to supply data to the decompression unit.

7. The circuit of claim 6 wherein the decompression unit is configured to determine whether identified data needed for the scanout operation is compressed.

8. The circuit of claim 7 wherein when the data is not compressed, the decompression unit is configured to retrieve the data from the latency buffer and pass the data to the filter.

9. The method of claim 8 wherein reconstituting includes at least one of setting the LSBs of the cached data equal to the LSBs of the live sample, computing new LSBs for the cached data using a small color gradient, and setting the LSBs of cached data to zero or a random value.

10. The circuit of claim 7 wherein when the data is compressed, the decompression unit is configured to determine whether the data is in the cache and receive the data from the cache when the data is determined to be in the cache.

11. The circuit of claim 10 wherein when the data is determined to not be in the cache, the decompression unit is configured to retrieve the data from the latency buffer and configured to store at least part of the data in the cache.

12. The circuit of claim 11 wherein the decompression unit is configured to store the at least part of the data when the pixels being scanned out are in the first row of an atomic block of data.

13. The method of claim 7, further comprising:
reconstituting the additionally compressed data in the cache by identifying a live sample, which is non-truncated and close to the additionally compressed data in display coordinates, and comparing the MSBs of the live sample to the MSBs of the additionally compressed data.

14. A system for generating graphical image data to be displayed, comprising:

a graphics processor configured to generate oversampled data representing an image and to store the oversampled data in a frame buffer;
a memory interface configured to fetch data values from the frame buffer; and
a display pipe configured to perform a scanout operation, the display pipe comprising:
a latency buffer configured to receive data values from the memory interface and to provide groups of data values corresponding to a set of sample points;
a filter configured to receive the groups of data values from the latency buffer, to compute a pixel value from the data values and to transmit the pixel value for displaying by a display device, wherein the filter computes the pixel value during a scanout operation; and
a decompression unit coupled between the latency buffer and the filter, the decompression unit configured to receive data values from the latency buffer, to determine whether the data values correspond to compressed data, and to perform decompression during the scanout operation in the event that the data values correspond to compressed data, wherein the compressed data includes one or more color values, and wherein the decompression unit provides decompressed data to the filter.

15. The system of claim 14, further comprising:
a cache coupled to the decompression unit for storing the data values corresponding to compressed data.

16. A method for filtering oversampled data during a scanout operation, comprising:
reading the oversampled data for a first line from a frame buffer;
storing at least a subset of the oversampled data for the first line in a line store;
reading oversampled data for a second line from the frame buffer;
determining whether any of the oversampled data is compressed;
decompressing the oversampled data in the event that the oversampled data is compressed;
computing a weighted average of a plurality of values selected from the oversampled data for the first line and the second line, thereby obtaining a pixel value; and
transmitting the pixel value for displaying by a display device.

17. The method of claim 16, further comprising:
storing the compressed oversampled data in a cache.

18. The method of claim 17, further comprising:
performing additional compression on the compressed oversampled data prior to storing the compressed oversampled data in the cache.

19. The method of claim 18 wherein the additional compression is lossy.

20. The method of claim 19, wherein the lossy additional compression includes dropping a selected number of least significant bits (LSBs).

* * * * *